United States Patent

Angelov et al.

[15] 3,691,358

[45] Sept. 12, 1972

[54] DECIMAL-POINT INDICATING SYSTEM, ESPECIALLY FOR ELECTRONIC CALCULATOR

[72] Inventors: Stefan Christov Angelov; Snejanka Vladimirova Hristova; Srebryn Yovtchev Srebrev, all of Sofia, Bulgaria

[73] Assignee: Zentralen Institut Po Istchislitelna Technika, Sofia, Bulgaria

[22] Filed: Aug. 31, 1970

[21] Appl. No.: 68,191

Related U.S. Application Data

[63] Continuation-in-part of Ser. No. 672,500, Oct. 3, 1967, Pat. No. 3,548,180.

[30] Foreign Application Priority Data

Oct. 4, 1966 Bulgaria ......................I-1,175

[52] U.S. Cl. ..................................235/159, 235/160

[51] Int. Cl. ................................................G06f 7/48

[58] Field of Search ...............................235/159, 160

[56] References Cited

UNITED STATES PATENTS

| | | | |
|---|---|---|---|
| 3,548,180 | 12/1970 | Angelov et al | 235/159 |
| 3,375,356 | 3/1968 | Scvitto et al | 235/160 |
| 3,074,635 | 1/1963 | Borne et al. | 235/156 |

*Primary Examiner*—Malcolm A. Morrison
*Assistant Examiner*—David H. Malzahn
*Attorney*—Karl F. Ross

[57] ABSTRACT

An electronic calculator or computer with a magnetic-core memory having a number of columns corresponding to the number of digits which may be manipulated and four lines connected with a binary encoder. The latter transforms the numerical value into a binary code for each digit with these binary codes being recorded in the respective columns. An additional line, having the same columns, is provided into which the decimal position is registered by a flip-flop or bistable multivibrator such that, whether or not the decimal key is depressed, each addition of a digit in the memory introduces a decimal point on the additional line while erasing all previous decimal-points. When the decimal point key is depressed, e.g. to introduce a fractional number, the multivibrator is controlled by controlled gates to enable the decimal point to shift with the last digit order recorded prior to depression of the decimal point. Decimal-point indication uses glow lamps between the numeral-display or counter tubes, the glow lamp associated with the digit of the corresponding column being illuminated when the particular column is "read."

9 Claims, 5 Drawing Figures

S. H. ANGELOV
S. V. HISTOVA
S. Y. SREBREV
*INVENTORS:*

*BY* Karl F. Ross
ATTORNEY

INVENTORS;
S. H. ANGELOV
S. V. HISTOVA
S. Y. SREBREV
BY
Karl F. Ross
ATTORNEY

S. H. ANGELOV
S. V. HISTOVA
S. Y. SREBREV
*INVENTORS:*

*BY* Karl F. Ross
ATTORNEY

INVENTORS;
S. H. ANGELOV
S. V. HISTOVA
S. Y. SREBREV

BY Karl F. Ross
ATTORNEY

DECIMAL-POINT INDICATING SYSTEM, ESPECIALLY FOR ELECTRONIC CALCULATOR

CROSS-REFERENCE TO COPENDING APPLICATION

This application is a continuation-in-part of our application, Ser. No. 672,500 filed 3 Oct. 1967 now U.S. Pat. No. 3,548,180.

FIELD OF THE INVENTION

Our present invention relates to electronic computers and calculators and especially electronic computers having at least one memory bank and a digital readout system for displaying numerical values; more particularly, this application relates to a decimal-point control, manipulating and indicating system for electronic computers and calculators of the aforedescribed type.

BACKGROUND OF THE INVENTION

Decimal-point indicating, storage and manipulating systems have been provided heretofore in electronic calculators, computers and other circuits having digital readout means for displaying a numerical value, e.g. any input or output of the calculating circuitry. These systems, in general, store information relating to the decimal point and its location in the numerical value to be displayed, i.e. its relationship to the display means, in a special counter or shift register independently of the memory bank or information-storage registers with which the computer or calculator may be provided. It will be understood that the use of the term "memory" herein is intended to designate substantially any type of information register having the capacity of storing numerical values, generally in digital form, for subsequent manipulation or readout. Such memories may include delay-memories, magnetic-disk or magnetic-drum storage, or memory banks having ferrite cores or provided with intersecting arrays of conductors or registering information in or reading information out of the memory bank. Primarily, however, the invention is intended to apply to electronic calculators and computers having memory banks with ferrite-core memories and intersecting arrays of conductors as noted earlier. Even with electronic calculators and computers having memories capable of storing relatively large numbers of bits or considerable information, it has hitherto been necessary, desirable or preferred to provide auxiliary storage facilities for registering information relating to the decimal point.

It will be apparent that such circuits are uneconomical, not only because of the additional components necessary to handle information relating to the decimal point, but also because of the added possibility of breakdown, inadequate response or the like. A particular disadvantage of prior art systems resides in the fact that they require a large number of circuits for the manipulation and indication of the decimal point.

OBJECTS OF THE INVENTION

It is the principal object of the present invention, therefore, to provide an improved electronic computer or calculating apparatus wherein the aforementioned disadvantages are obviated and the manipulation and storage of decimal-point information is facilitated.

It is another object of our invention to provide an improved circuit for indicating the decimal point in a display system of the type designed to provide digital readout of the results of mathematical manipulation.

Another object of our invention is the provision of an improved system, in an apparatus of the character described, for manipulating and storing decimal-point information.

It is still a further object of this invention to provide electronic calculator or computer circuits having greater economy of use of the components thereof and especially the memory bank than earlier systems.

SUMMARY OF THE INVENTION

These objects and others which will become apparent hereinafter and have been set forth in part in our earlier application, are realized in an electronic computer or calculator having a ferrite-core memory or register, having a plurality of columns and a plurality of lines in an intercepting array with ferrite-memory cores at the intersection of the arrays, for the manipulation of numerical data.

The invention resides in the provision of a further or supplemental line of the same memory bank, the ferrite cores of which lie along the same conductors and along which the principal memory ferrites are provided.

The conductor common to the ferrite cores of the supplemental line of this memory register is connected at one side through a pulse transformer, a reading amplifier and a controlled or sampling gate to one of two inputs of a triggering circuit and, at the same side, by the pulse transformer and a writing amplifier to the outputs "zero" and "one" of the same triggering circuit. In turn, the input "one" of this triggering circuit is connected through a controlled sampling gate, together with its input "0" but directly to a circuit for introducing the decimal point into the memory.

This circuit insures the presence of a decimal point in each whole number independently of the actuation of a special key or keyboard array of the computer designed for introducing the decimal point at the proper location of a fractional number. In other words, a decimal-point input is provided automatically whether or not the decimal-point keys are actuated. An input "1" of the latter triggering circuit is connected through a third controlled or sampling gate to a circuit for processing or manipulating the decimal point, this manipulation circuit determining the location of the decimal point as a result of the computing operations. The output "1" of the triggering circuit is also connected to the decimal-point indicating means.

In general terms, therefore, the electronic calculator or computer of the present invention may be considered to have a magnetic-core storage or memory having a plurality of parallel lines and an intersecting array of columns at the intersections of the columns and lines, there being provided magnetic-storage means adapted to be sampled along the lines when a reading generator applies its signals along the columns, a recording generator being similarly connected to the columns.

The sampling means connected to each line may include shift registers, gates and other manipulating circuitry for processing the mathematical information stored in the memory and counter tubes for displaying the mathematical result. The decimal point control circuit for manipulating the decimal point of the displayed information, therefore, comprises at least one further line of the magnetic-core storage or memory having a multiplicity of columns connected in the columns of the remainder of the memory. A read-in network is provided for introducing a decimal point into the first column together with the introduction of a particular whole number into the memory for advancing the decimal point indication to the next column upon introduction of the next number while erasing or cancelling the previous decimal point indication and continuing the process for the entire introduction of registering of numerical values in the memory. The decimal-point indicating means is connected with the circuit for displaying the location of the decimal point in dependence upon the position of the "bit" registered in the auxiliary line of the memory.

The circuit means for displaying the location of the decimal point may include a flip-flop circuit switchable to apply a "1" to each position along the added line and reversible to cancel the bit from its position in which such registry is not desired, e.g. by effectively recording a "0" in all of the positions along the line prior to a final recordal of the "1." A conditional differentiating group (controlled gate of the CRD type) is connected to the flip-flop circuit while a one-shot multivibrator is connected to the conditional differentiating group and is triggerable into a "1" state to enable the flip-flop circuit to read the "1" into the further line of the memory. Another conditional differentiating group is connected to the one-shot multivibrator while a further flip-flop circuit is connected to the differentiating groups to apply pass or inhibition signals thereto; a pushbutton or key system forms part of the electronic calculator keyboard and operates the further flip-flop circuit for intentional setting of the decimal point. A multiplicity of neon lamps is connected between the counter tubes forming means for displaying the decimal point. Amplifier means is connected with the counter tubes of which each have an anode connected with one terminal of a respective neon lamp. Another terminal of each of the neon lamps is connected to a common amplifier while scanning means is provided, in the form of flip-flop circuits, for counting down the columns of the further line to the decimal point position and operating the corresponding neon lamp.

The term "conditional-differentiating group" is used herein to refer to controlled (sampling) or logic gates of the CRD type wherein the signal input is applied to one side of a capacitor, the other side of which is connected to the junction point of a resistor and one terminal of a diode. The other terminal of the latter constitutes the output, while the resistor may be grounded or provided with a constant signal level in the case of a logic gate or may be triggered with a control, gating or enabling pulse in the case of a sampling gate.

When the system of the present invention is used in electronic calculations for the manipulation of numbers of the base 10, we provide a ferrite-core memory having four horizontal lines and multiplicity of vertical lines, the latter corresponding to the number of digits the apparatus can handle. The four horizontal lines are used to record the digits in the memory with the aid of four counters in accordance with conventional translation of the digits 0 – 9 into a binary code. Each vertical line, therefore, stores a single digit. According to the principles of this invention, discussed generally above, a fifth horizontal line is provided in the memory, with the ferrite-cores thereof being connected to the vertical lines or columns of the existing memory. The horizontal conductor of the additional line is connected through a pulse transformer, a reading amplifier and a controlled gate to the input of a bistable-multivibrator triggering circuit. The same horizontal conductor is connected by the pulse transformer and the recording amplifier to the outputs "0" and "1" of the bistable-multi-vibrator triggering circuit whose inputs are connected via a controlled gate to a circuit for introducing the decimal point into the system. The circuit is designed to add a decimal point each time a digit is introduced into the memory regardless of whether or not the decimal-point key is depressed.

DESCRIPTION OF THE DRAWING

The above and other objects, features and advantages of this invention will become more readily apparent from the following description, reference being made to the accompanying drawing in which.

SPECIFIC DESCRIPTION

Figure 1:
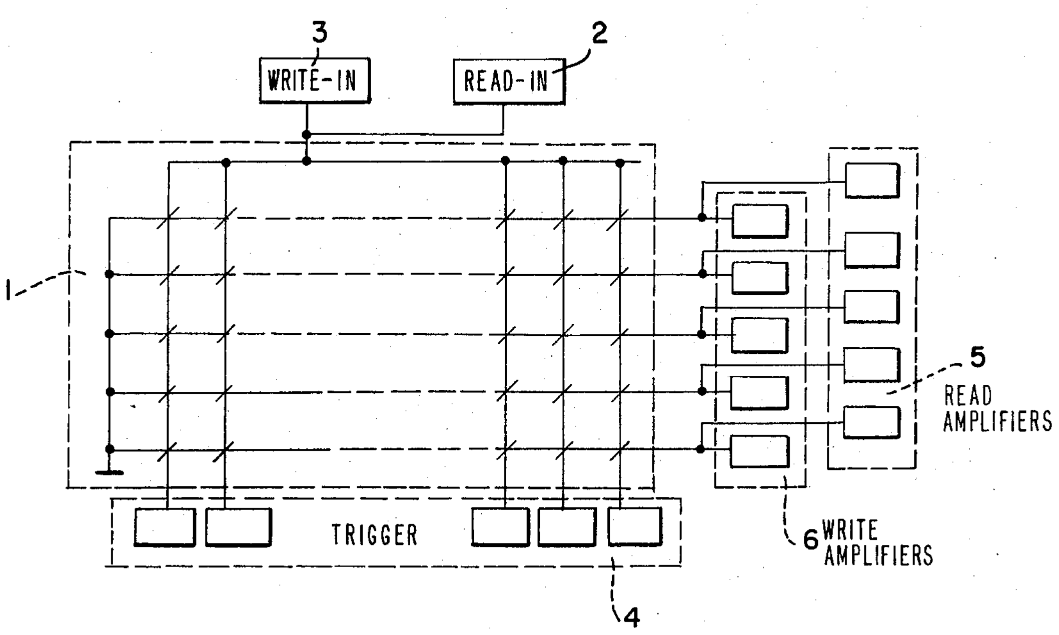
FIG. 1 is a block diagram of a magnetic-core storage or memory according to the invention.

In FIG. 1 of the drawing, we show a magnetic-core storage or memory which may be of the line-and-column type described, for example, in DIGITAL COMPUTER BASICS, pages 99 ff., U.S. Government Printing Office, Washington, D.C. 1968, in which ferrite-core bit-registry elements are provided at the intersections of the lines and columns. The result is a core-plane array in which the sensing circuits are connected to the lines and the bit-writing and bit-reading generator circuits are connected to the columns. The circuit of FIG. 1 also includes a reading-pulse generator, applying the signal necessary to activate the ferrite cores to produce an output at the corresponding sense line. Information is stored in the memory in the usual manner, i.e. with the aid of a write-in pulse generator represented at 3, the trigger circuits for the memory being represented at 4. Typical triggering circuits for this purpose are also described in DIGITAL COMPUTER BASICS (op. cit) and may be of the type identified as the core, sequencer and track switch logic in U.S. Pat. No. 3,330,946. The read amplifier is shown at 5 in FIG. 1 while the write-in amplifier is represented at 6.

Figure 2:
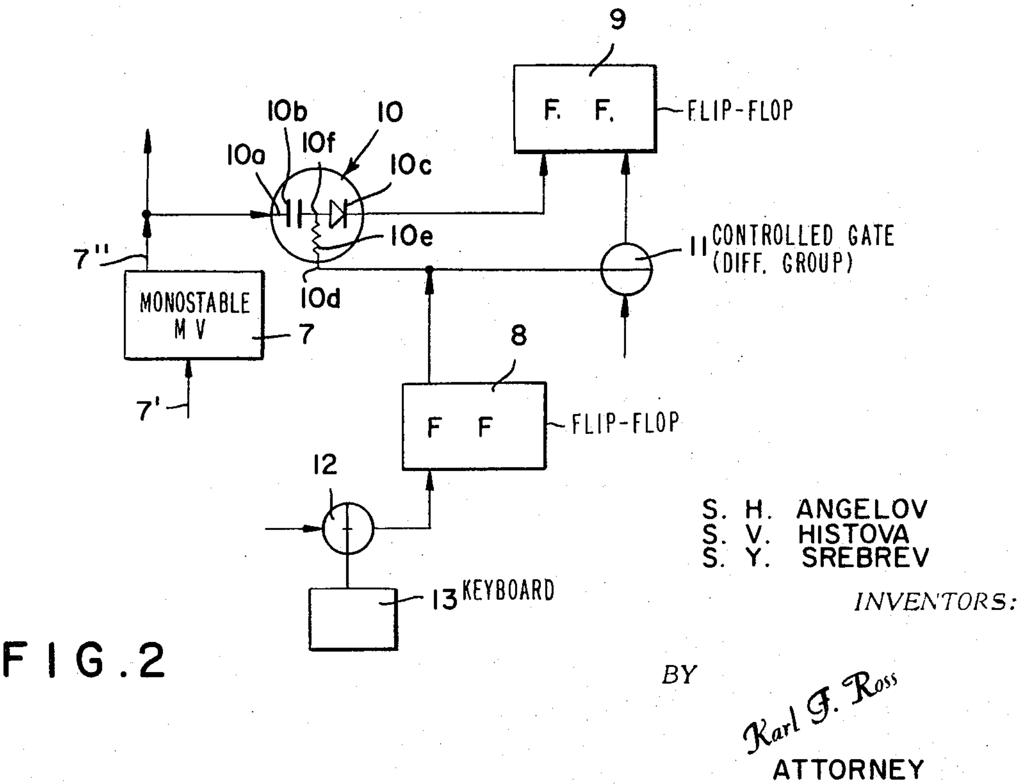
FIG. 2 is a block diagram illustrating the circuitry for introducing the decimal point information into the memory.

In FIG. 2 we show a circuit for introducing the decimal point information into the member and comprising a one-shot or monostable multivibrator 7 whose triggering input is represented at 7' and whose output 7'' is connected via a controlled gate 10 of the capacitor, resistor and diode type described in PULSE, DIGITAL AND SWITCHING WAVE FORM, McGraw-Hill Book Co., New York, 1965, pages 628 ff. Hereinafter these gates, also termed "conditional differentiating groups," will be referred to as controlled gates which have the circuit representation illustrated at 10 but the schematic representation shown at 11 and 12 in FIG. 2. Each gate comprises a signal input 10*a* through a capacitor 10*b* tied to a diode 10*c* with the control or gate input 10*d* being applied through a resistor 10*e* to the junction point 10*f* of the capacitor with the diode. The unidirectional diode gate 10 is designed for a positive-going input signal. The gate signal, also called a control pulse, a selector pulse or an enabling signal or pulse, may make transitions between two values. When the value of the gate or control input is selected so that only part of the signal input above this value appears at the output, the circuit is a threshold gate.

The control or enabling input for the controlled gate 10 is the flip-flop circuit 8 whose output also triggers the controlled gate 11, the signal input of which is derived as described hereinafter. The flip-flop 8, moreover, is energized by a keyboard signal from the source 13 via the control gate 12. Controlled gates 10 and 11 operate the flip-flop circuit 9 whose output is applied to the memory system as described in connection with FIG. 5.

Figure 3:
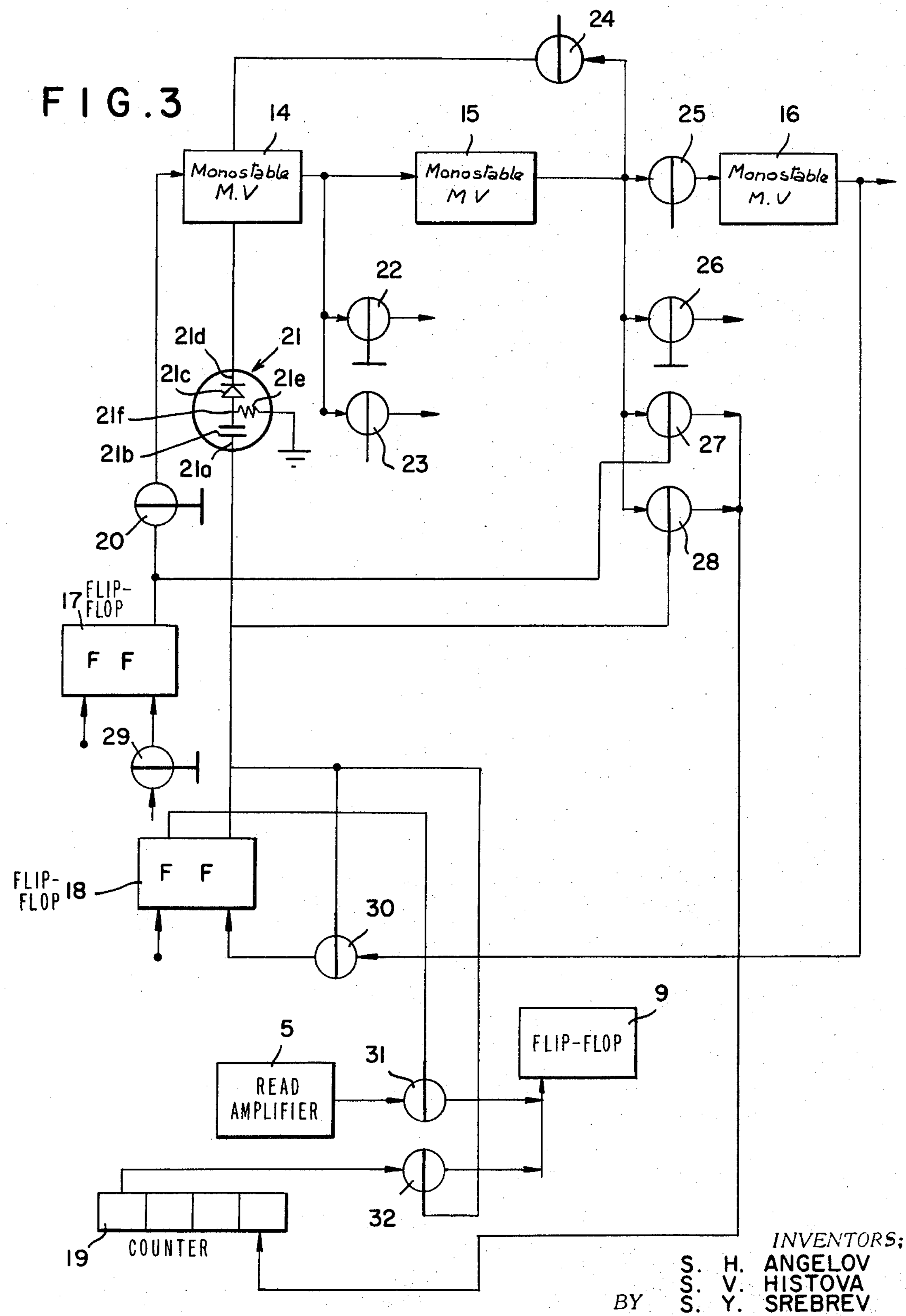
FIG. 3 is a block diagram of the readout system according to this invention.

FIG. 3 represents a system for recording the decimal point in the output register and for otherwise processing the decimal point in accordance with the present invention. In this circuit one-shot or monostable multivibrator 14 has an output triggering the monostable multivibrator 15 directly and the monostable multivibrator 16 via a gate 25.

The output of the monostable multivibrator 14 also constitutes the signal inputs to a pair of gates 22, 23 while the multivibrator inputs are derived from gates 20 and 21 and the bistable multivibrators or flip-flops 17 and 18. The latter are triggered via gates 29 and 30. At 5 and 9 in FIG. 3, there are represented the corresponding elements of FIGS. 1 and 2.

Gates 20, 21, 26 and 29 are of the noncontrolled type generally referred to as logic gates, but also have the CRD configuration illustrated for the gate 21 in FIG. 3. Hence the input is supplied at 21*a* to a capacitor 21*b*, the latter type to a diode 21*c* whose output is represented at 21*d*. A resistor 21*e* is connected to the junction point of the capacitor and the diode at 21*f* and is grounded or maintained at a permanent zero potential. Such gates are described in PULSE, DIGITAL AND SWITCHING WAVEFORMS, pages 306 ff. In such circuits the application of a positive signal at the input results in a signal at the output. The schematic designation at this type of gate can be seen at 20 and 29 in FIG. 3. The gate 26 is connected to the read network to regenerate the information while gates 22 and 23 are connected to the read network to extract the information. The multivibrator 16 may operate the counter 19 as will be apparent hereinafter.

Figure 4:
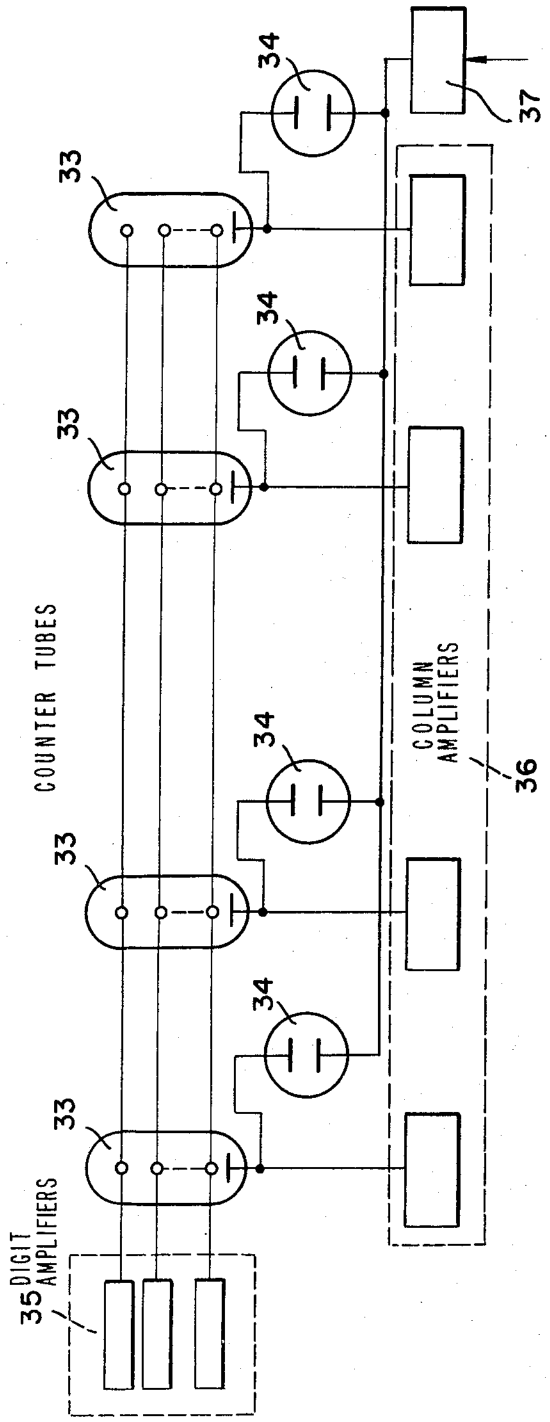
FIG. 4 is a diagram of the indicating means.

In FIG. 4 there is illustrated the display system including counter tubes 33 whose neon or glow lamps 34 are connected to the anodes of the counter tubes, the digit amplifiers being indicated at 35 while the amplifiers for the respective columns are shown at 36 and the decimal point amplifier is represented at 37.

Figure 5:
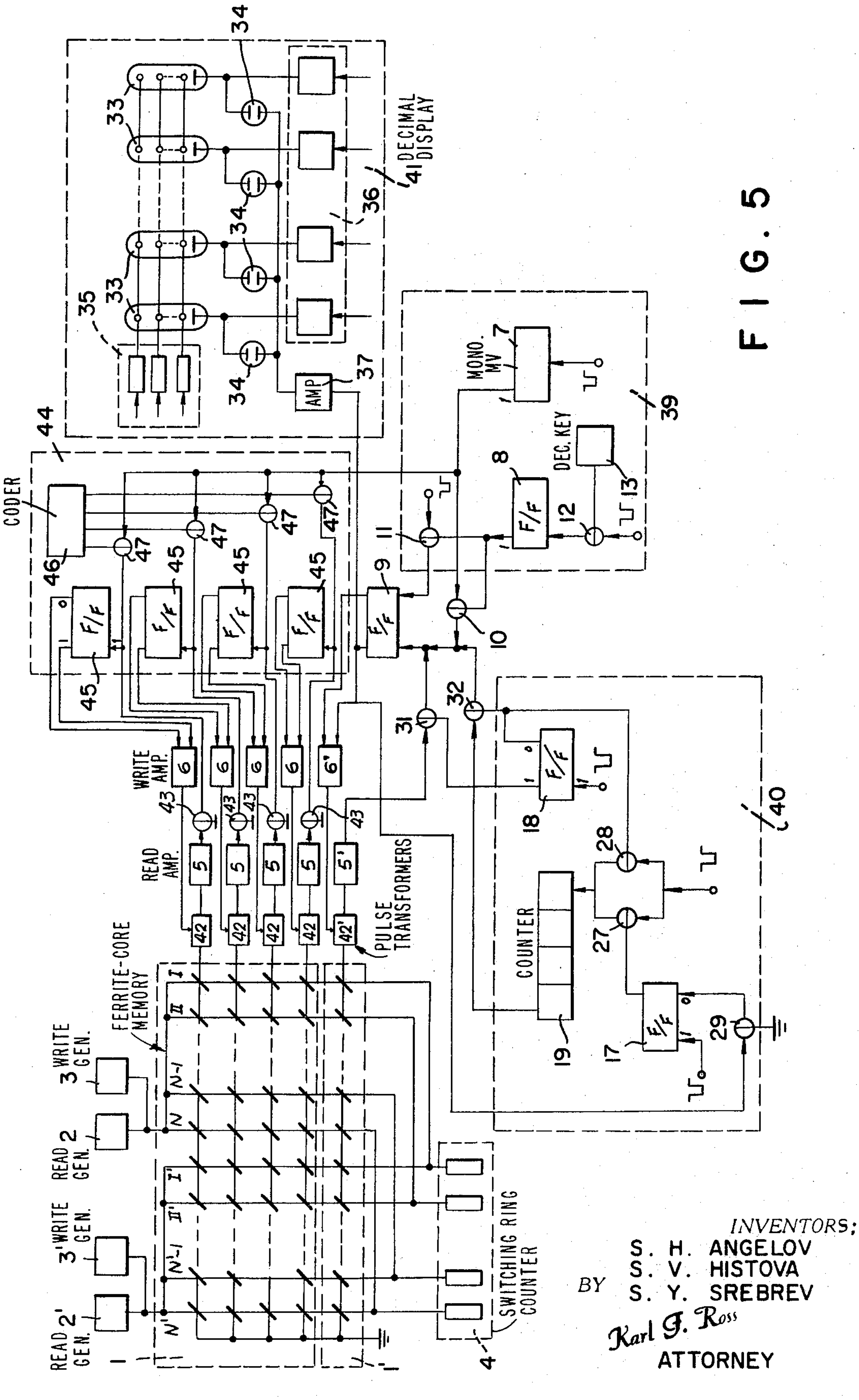
FIG. 5 is a modified block diagram of the overall system.

In FIG. 5, we have shown in block-diagram form the apparatus of FIGS. 1 – 4 combined in the total system with duplication avoided.

In FIG. 5, the ferrite-core memory 1 is shown to comprise two resistors as is normally the case in electronic calculating machines for introducing the set of digits adapted to act as the operator and the set of digits which is to be operated upon. This ferrite-core memory and the system for encoding digital information in a binary code, the registration of the information in the memory and the keyboards for introducing the digits and initiating the various mathematical operations are fully conventional and may be of the type set forth in U.S. Pat. No. 3,330,946 or U.S. Pat. No. 3,361,898. In general, these conventional circuits include a reading generator 2, 2' for each of the memories and a recording generator 3, 3'. As in the system of FIG. 1 the ferrite-cores of the memory 1 are arranged in four horizontal lines adapted to receive the binary code information and a number of vertical columns, I, II . . .N–1, N and I', II'', N'–1, N', corresponding to the number of digits which may be accommodated by the memory. A single digit is stored in each vertical column.

To determine the location of any digit in the ferrite memory 1, we provide a multiplicity of switching circuits 4 of the ring counter type (see PULSE, DIGITAL AND SWITCHING WAVE FORMS, pages 668 ff) connected to the decoder, clocks or pulse sources and counters of the computer and controlled as described in any of the aforementioned patents.

The horizontal conductors of the ferrite-core memory 1, are connected through the pulse transformers 42 (see pages 64–82 of PULSE, DIGITAL AND SWITCHING WAVEFORMS), the reading amplifiers 5, the recording amplifiers 6 and the logic gates 43 (of the configuration shown at 21 in FIG. 3) to a circuit 44 hereinafter described as the encoder circuit, for the transformation of the digits of the base 10 system to binary members. The circuit 44 may be identical to the encoders of U.S. Pat. No. 3,330,946 or U.S. Pat. No. 3,361,868 and comprise four triggering circuits (bistable multivibrators) 45 for each binary digit, a circuit 46 constituting the input of the encoder and having the usual keyboard switches, a number of controlled gates 47 of the configuration illustrated at 10 in FIG. 2. The signal inputs of the controlled gates 47 are connected with the output "1" of the monostable multivibrator 7 described above and constituting part of the circuit 39 for introducing the decimal point into the system. The control or enabling inputs of the gates 47 are connected to the circuit 46 for introducing the digits into the system. The inputs of the circuit 46 are, of course, the digital keys of the calculator key-board which are entirely conventional and have not been illustrated.

The outputs of the controlled gates 47 are applied to the inputs "1" of the triggering circuits 45, the outputs "0" and "1" of these triggering circuits are connected to the inputs of the corresponding writing amplifiers 6. The outputs of gates 47 and the inputs "1" of the triggering circuits 45 are also connected to the reading amplifiers 5 through logic gates 43.

In accordance with the present invention, a fifth or additional horizontal line 1' is provided in the ferrite-core memory, the ferrite cores of this additional line lying in the original columns of the four-line storage 1. The horizontal conductor of this additional line 1' is connected through a pulse transformer 42' (similar to the pulse transformers 42 and of the type described at pages 64–82 of PULSE, DIGITAL AND SWITCHING WAVE FORMS) to a reading amplifier 5'. The output of the latter is connected to the signal input of the controlled gate 31, the output of which is connected to the "1" of the bistable multivibrator triggering circuit 9. The same pulse transformer 42' and an associated recording amplifier 6' are connected to the outputs "0" and "1" of the triggering circuit 9.

The triggering circuit 9 provides the transition or "-direct" connection between the fifth or additional line of the ferrite-core memory and the circuitry 39 of the computer used for introducing the decimal point, the circuitry 40 for processing the decimal point and the circuitry 41 for displaying or indicating the decimal point.

The input "1" of the bistable multivibrator 9 is also connected to the output of the controlled gate 10 whose signal input is received from the output "1" of the monostable multivibrator 7 adapted to be triggered with a negative squarewave pulse as illustrated. The control or enabling input of the gate 10 is received from the output "1" of the bistable multivibrator 8 whose "1" input receives the switchover pulse through the controlled gate 12. The enabling or control pulse of the latter gate is received from a pushbutton switch 13 of the keyboard, actuated to insert a decimal point in a chain of digits which does not represent a whole number. The input "0" of the triggering circuit 9 is derived directly from the decimal-point insert circuit 39, namely, from the controlled gate 11 whose signal input is provided with a negative pulse illustrated from a clock-pulse generator in accordance with conventional practices. The triggering circuit 8, of course, also energizes the control or enabling input of the gate 11.

The input "1" of the triggering circuit 9 is, moreover, connected through the controlled gate 32 to the processing circuit 40 and, more particularly, to the output of the gate 32 whose signal input is derived from the reversible counter 19, while the control or enabling input is derived from a bistable multivibrator 18, the function of which will be apparent hereinafter.

As has already been described, the circuit 39 is designed to introduce a decimal point upon actuation of the decimal-point key when a fractional number is introduced into the one of the operating registers, but also provides a decimal point when a whole number is introduced, even when the decimal point key is not actuated. The monostable multivibrator 7 is triggered to generate the decimal point pulse which is introduced via gate 10 even if the gate 12 remains blocked by lack of actuation of the decimal point key. When, moreover, the key 13 is not depressed, the signal applied at 11 cancels the decimal point introduced with the preceding light.

From FIG. 5, it can also be seen that the output "1" of the monostable multivibrator 7 is also applied as the signal input to the controlled gates 47 of the digit-registering circuit 44. The negative pulses represented at the component 7, 11, 12, 17, 18, 27 and 28 are of course clock pulses from the computer-control circuit, e.g. as described in U.S. Pat. No. 3,330,946.

The processing circuit 40 includes the reversible counter 19 (see pages 672 – 713 of PULSE, DIGITAL AND SWITCHING WAVEFORMS), and the bistable multivibrator or trigger 18 serving to record the decimal point in the result. The triggering circuit (17) has its input "1" energized with the clock pulse of the computer-control system, while the input "0" of this triggering circuit is energized through the logic gate 29 from the out-put "1" of the bistable multivibrator 9. As indicated, the input "1" of the triggering circuit 17 and 18 and the signal inputs of the controlled gates 27 and 28 are triggered with the pulses from the pulse source of the computer. The control or enabling input of the controlled gate 27 is connected to the output "0" of the triggering circuit 17 while the control or enabling input of the gate 28 is connected to the output "0" of the triggering circuit 18 as well as to the control or enabling input of the gate 32 previously described. The output "1" of the triggering circuit 18 is applied to the control or enabling input of the gate 31 between the amplifier 5' and the bistable multivibrator or flip-flop 9. The outputs of both controlled gates 27 and 28 are applied in parallel to the input of the reversible counter 19, the output of the latter being connected to the signal input of the controlled gate 32. The latter gate 29 has its "control" or enabling input connected to ground as previously described.

The circuit 41 for indicating the decimal point, i.e. for displaying the decimal point in its proper relationship to the displayed digits in a numerical result, for example, provides the glow-discharge or neon lamps 34, the amplifier 37, the digit amplifiers 36 and the digit-display tubes 33, the latter being conventional.

The anodes of the numerical or digital display lamps 33 are connected to the amplifiers 36 of the respective order (units, tens, hundreds, etc.) and to the upper electrodes of the glow-discharge or neon lamps 34. The lower electrodes of these lamps 34 are connected via a common bus bar to the output of the decimal-point amplifier 37, the input of which is tied to the output "1" of the bistable multivibrator 9. The inputs of the amplifiers of the respective digit orders are connected to the decoder outputs in the conventional manner, not illustrated here as conventional. However, the output of each amplifier 35 of the digits is connected to the corresponding electrode of the tubes 33 by respective bus bars, the digit amplifiers 35 being controlled by the decoder.

In operation, depression of the keyboard keys for inserting the respective digits results in the operation of the gates 47 of the encoders for the digits and the application via the monostable multivibrator 7 of a signal input to the respective controlled gates 47. The same pulse, operating via the controlled gate 10, sets the triggering circuit 9 in its "1" state when the triggering circuit 8 is in its "0" condition corresponding to an inactive position of the decimal point key 13. The digit is, of course, inserted into the memory 1 while at the same time a decimal point is stored in the first column of the memory but along the additional line 1'. The column I, therefore, is occupied by the initially inserted digit and a decimal point, the subsequent pulse resetting the triggering circuits 45 and 9 to the "0" condition. When a second digit key is depressed, the selected digit is recorded in the triggering circuits 45 in the proper digital code in the manner previously described while a further decimal point is introduced by the triggering circuit 9. The subsequent pulse from the clock of the computer displaces the initial digit and the initial decimal point, hitherto recorded in column I of the memory, one order to the left (i.e. to column II) while the second digit and its decimal point is stored at column I by transference of these signals from the bistable multivibrators 45 and 9. The decimal point in column II of line 1′ of the memory is erased by the simultaneous pulsing of the reading generator 2 and the switching circuits 4 which operates amplifier 5′ and, via the gate 31, triggers the bistable multivibrator 9 to cancel all the previously recorded decimal points in line 1′ and permits only the decimal point in the right-hand column I to be restored.

Depression of the key for the third digit results in a repetition of the aforedescribed sequence with stepping of the digits of one order to the left and the introduction of a second decimal point in the previously emptied column I. Again the superfluous decimal point is erased. In this manner, as long as the key 13 is not depressed and the digit keys are operated to insert a numerical value, a decimal point is stored in column I which corresponds to the neon lamp following the digit of lowest order in the selected number.

When, however, a fractional number is to be introduced into the memory, the digits ahead of the decimal point are inserted, as previously described, by operation of the digit keys and the decimal point key 13 is depressed after the last of these digits. Depression of key 13 enables the gate 12 to pass the clock pulse which operates the triggering circuit 8 to place the latter into the "1" state and apply a hold to the enabling inputs of the gates 10 and 11. When a digit key is actuated after depression of the decimal point key 13, the pulse passed by the monostable multivibrator 7 is applied to the gates 47 to the appropriate triggering circuits 45 of the digital encoder to set them in the state "1." The bistable multivibrator 9, however, remains in the "0" state, the gate 10 being blocked. The decimal point is not introduced with this digit, nor is a decimal point introduced until the next number is inserted. Since a decimal point remains recorded in the line 1′ following the last of the digits preceding the decimal point, the shift of the orders to the left carries along the previously recorded decimal point because, when the bistable multivibrator 9 remains in its "0" state, the alternating erasure and reinsertion of the decimal point are ineffective and the decimal point is merely stepped in the manner of the stepping of the digits. In the register, therefore, there is a single decimal point in the column of the digit which was introduced before depression of the decimal point key 13.

In the processing of the numbers recorded in the apparatus, e.g. multiplication, the circuit 40 comes into play to automatically position the decimal point with respect to the result.

The numbers which are to be multiplied are, in the usual manner, preliminarily stored in the two registers of the memory 1, their respective decimal points being represented by information stored in the two sections of the decimal point line 1′. When the "multiplication" key is depressed, the clock pulse supplied to the triggering circuit 17 sets the latter to the "1" state and applies a passing condition to the enabling input of the gate 27. The numbers stored in the first and second registers of the memory and the decimal point information follow beginning with the lowest order of both numbers. The reversible counter 19 receives via the gate 27 a number of clock pulses corresponding to the total number of the decimal digits of both of the stored numerical values, i.e. the numbers of digits behind the decimal point in each register. Column I is read and the information applied to the triggering circuit 45 and 9. When this column does not contain a decimal point, triggering circuits 9 and 17 remain in the "0" state so that the clock pulse passes through gate 27 to step the counter 19 by one unit. Reading of columns II . . . . . results in similar stepping of the reversible counter. When, however, a column is read which contains the decimal point, the triggering circuit 9 is switched into its "I" state and this circuit, in turn, resets the flip-flop 17 into its "0" state through the logic gate 29. Gate 27 is thereby blocked so that no further pulses are applied to the counter 19 until the reading sequence terminates.

The total in counter 19 represents the column or order of the result ahead of which the decimal point must be provided. When the result is read beginning with the lowest order, the triggering circuit 18 is placed in the "1" state to render gates 28 and 32 conductive to the clock pulse, thereby stepping the counter 19 in the reverse mode and subtracting one count for each digit of the result. The reading of the successive digits of the result diminished the contents of the reversible counter 19 digit by digit and, when the counter is brought to a zero state, a pulse is permitted to the circuit 9, through the gate 32 to initiate the decimal point information sequence and insert a decimal point in the result in the same column of the memory read as the counter reaches zero.

The columns of the register, in the display mode, are applied to the circuit 41 by consecutive but continuous cycling through the columns of the register commencing with the column I. The outputs via the triggering circuits 45 and 9, the former being connected to the decoder, operate the digit amplifiers 35 and, during the reading of a column having a decimal point switching, the triggering circuit 9 into the "1" state to apply a signal to the amplifier 37, complete a circuit through the respective glow-discharge lamp of the digit-display tube of the column read at that instant.

We claim:

1. In an electronic calculator or computer having a magnetic-core memory with a plurality of columns for registering digits in a binary code and a plurality of lines crossing said columns and connected with means for transforming digits introduced into the system by depression of digit keys into a binary code with the binary bits being applied to said lines, means for reading the digits recorded in said columns, means for stepping the digits from column to column in said memory, and means for mathematically manipulating the digits recorded in said columns, the improvement which comprises means for manipulating a decimal point, comprising:

further line of said magnetic-core memory having magnetic cores in the respective columns thereof;

bistable-multivibrator means connected with said further line and triggerable upon introduction of each digit into said memory for storing a decimal point bit in the magnetic core of the corresponding column in which the digit is stored;

first control means for stepping the decimal point bit registered in said further line from column to column therealong with the stepping of said digits from column to column;

second control means connected to said bistable-multivibrator means for canceling all decimal point bits upon the introduction of a new digit in all columns but the column in which said new digit is introduced; and third control means for inactivating said second control means for preventing introduction of a decimal point bit by said bistable-multivibrator means and the cancellation of a previously introduced decimal point bit upon operation of said third control means while permitting the previously registered decimal point bit to be stepped along said columns with said digits.

2. The improvement defined in claim 1 wherein said third control means includes a decimal point key forming part of a keyboard of said calculator or computer, a bistable multivibrator, a first controlled gate having a signal input connected to a source of pulses and an enabling input operated by said decimal point key to energize said bistable multivibrator through said first controlled gate, a pair of further controlled gates connected to "0" and "1" inputs of said bistable-multivibrator means and having enabling inputs connected to the "1" output of said bistable multivibrator, one of said further controlled gates being energized at its signal input by a pulse from said source for cancellation of the decimal point bits in said columns and constituting part of said second control means.

3. The improvement defined in claim 2 wherein said first control means includes a monostable multivibrator triggered by the pulses from said source, the other of said further controlled gates having its signal input connected to said monostable multivibrator for energization thereby, said means for transforming said digits including a bistable-multivibrator triggering circuit connected to each of said lines, an encoder operable by said digit keys for producing binary-code values of said digits, and respective controlled gates having outputs connected to said triggering circuits and enabling inputs connected with said encoder, the output of said monostable multivibrator being connected with signal inputs of the controlled gates connected with said triggering circuits.

4. The improvement defined in claim 2, further comprising a reversible counter, a pair of controlled gates having their outputs connected in common to said counter and triggerable at the respective signal inputs by said pulses, a further controlled gate having its signal input connected with the output of said counter and an output connected with a "1" input of said bistable-multivibrator means, and further bistable-multivibrator means operable upon reading of said digits registered in said columns and controlling said controlled gates for recording in said counter the number of digits registered in said memory behind said decimal-point bit.

5. The improvement defined in claim 4, further comprising a plurality of counter tubes having respective anodes and electrodes operatively connected with said reading means for registering numerical values on said counter tubes, a plurality of glow lamps for indicating location of a decimal point, each having an electrode connected with a respective anode of a counter tube associated with the corresponding column of said memory, and a decimal point amplifier connected with the other electrode of all of said glow lamps and with the output of the said bistable-multivibrator means.

6. A circuit for handling the decimal point in calculator or computer, comprising:

a ferrite-core memory (1) with four lines in the horizontal sense for the storage of the digits of a number provided, and a fifth horizontal line (1'), the ferrite cores of said fifth line being placed along the vertical conductors of the four lines of said memory;

a pulse transformer (42), a reading amplifier (5), a controlled CRD gate (31), and a triggering current (9), the horizontal conductor of said fifth line (1') connected by said pulse transformer, reading amplifier and controlled CRD gate to the input "one" of a triggering circuit (9), and through the said pulse transformer (42) and a recording amplifier (6) to the outputs "one" and "zero" of said triggering circuit (9);

a controlled CRD gate (10) connected to the input "one" of said triggering circuit (9);

a circuit (39) for the introduction of a decimal point connected directly to the input "zero" of said triggering circuit (9), said circuit (39) ensuring the presence of a decimal point in the number independently of operation of a decimal point key (13);

a controlled CRD gate (32) and a circuit (40) provided for the processing of the decimal point, the input "one" of said triggering circuit (9) being connected through said controlled gate (32) to said processing circuit (40), said processing circuit (40) determining the place of the decimal point in the result obtained by different computing operations; and a circuit (41) used for the indication of the decimal point, the output "one" of said triggering circuit (9) being connected to said indication circuit (41), said indication circuit (41) ensuring the indication of the decimal point after any order in accordance with the rank of the digit.

7. The circuit defined in claim 6 wherein said circuit (39) includes a flip-flop (8), a monostable monovibrator (7) and additional controlled CRD gates (11), (12), an output "1" of said monostable multivibrator (7) being connected to the pulse input of said controlled CRD gate (10), the control electrode of the latter CRD gate being connected to the output "one" of said flip-flop (8), the output "one" of the flip-flop (8) also being connected to the control electrode of a controlled CRD gate (11), and the input "one" of the flip-flop (8) being connected through a controlled CRD gate (12) to the key (13) for the decimal point, the actuation of said key setting the flip-flop (8) in the state "one."

8. The circuit defined in claim 6 wherein said circuit (40) comprises a controlled CRD gate (28) having an output connected to a reversible counter (19), the control electrode of said CRD gate (28) being connected to the output "zero" of a triggering circuit (18), the output "zero" of said triggering circuit (18) being connected to the control electrode of a controlled CRD gate (32), the pulse input of said CRD gate (32) being connected to the output of said reversible counter (19), the output "one" of said triggering circuit (18) being connected to the control electrode of a controlled CRD gate (31) provided for the storage in the memory (1 and 1') of the order of the result obtained, and the input "zero" of a triggering circuit (17) being connected through a controlled CRD GATE (29) to the output "one" of said triggering circuit (9).

9. The circuit defined in claim 6, wherein said circuit (41) includes a group of glow-discharge lamps (34), first electrodes thereof being connected to the anodes of a group of digit indicating lamps (33) respectively, and second electrodes of said glow-discharge lamps (34) being connected by means of a common bus to the output of an amplifier (37) for the decimal point, the input of said amplifier (37) being connected to the output "one" of the triggering circuit (9).

* * * * *

UNITED STATES PATENT OFFICE
CERTIFICATE OF CORRECTION

Patent No. 3,691,358 Dated September 12, 1972

Inventor(s) Stefan Hristov Angelov et al.

It is certified that error appears in the above-identified patent and that said Letters Patent are hereby corrected as shown below:

In the heading line [72] read the middle name of the first inventor as -- Hristov -- and the first name of the third inventor as -- Srebryu --.

Signed and sealed this 1st day of May 1973.

(SEAL)
Attest:

EDWARD M.FLETCHER,JR.
Attesting Officer

ROBERT GOTTSCHALK
Commissioner of Patents